United States Patent
Ryu et al.

(10) Patent No.: US 8,036,713 B2
(45) Date of Patent: Oct. 11, 2011

(54) APPARATUS AND METHOD FOR PROVIDING STANDBY SCREEN IMAGE OF MOBILE TERMINAL

(75) Inventors: Mee-Kyung Ryu, Seoul (KR); Mi-Ok Kim, Seoul (KR); Han-Sol Huh, Seoul (KR); Hyang-Sook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 827 days.

(21) Appl. No.: 12/041,438

(22) Filed: Mar. 3, 2008

(65) Prior Publication Data
US 2008/0220816 A1   Sep. 11, 2008

(30) Foreign Application Priority Data

Mar. 5, 2007   (KR) ........................ 10-2007-0021673

(51) Int. Cl.
*H04M 3/42* (2006.01)
*H04M 1/00* (2006.01)
*H04M 9/00* (2006.01)
*H04B 1/38* (2006.01)

(52) U.S. Cl. ..................... 455/566; 455/414.1; 455/567; 379/428.03; 379/433.04

(58) Field of Classification Search ............... 455/414.1, 455/418, 566, 567; 379/29.1, 93.17, 122, 379/136, 142.17, 144.08, 167.12, 247, 428.03, 433.04

See application file for complete search history.

(56) References Cited

U.S. PATENT DOCUMENTS

| | | | |
|---|---|---|---|
| 6,449,498 B1 * | 9/2002 | Kirbas et al. | 455/566 |
| 7,522,912 B2 * | 4/2009 | Seo et al. | 455/414.1 |
| 7,542,785 B2 * | 6/2009 | Shin et al. | 455/566 |
| 7,800,633 B2 * | 9/2010 | Seo | 345/629 |
| 2005/0124389 A1 * | 6/2005 | Yang | 455/574 |
| 2007/0082709 A1 * | 4/2007 | Okagaki | 455/566 |
| 2007/0105597 A1 * | 5/2007 | Hwang | 455/566 |

FOREIGN PATENT DOCUMENTS

CN   1901717 A   1/2007

* cited by examiner

*Primary Examiner* — Andrew Wendell
(74) *Attorney, Agent, or Firm* — Birch, Stewart, Kolasch & Birch, LLP

(57) ABSTRACT

An apparatus and a method for providing a standby screen image of a mobile terminal are disclosed to change a standby screen image in a story-telling manner according to a communication event or a usage amount of the terminal. The method for providing a standby screen image of a mobile terminal includes: displaying a standby screen image of one or more themes; and changing the displayed standby screen image in a story-telling manner according to a usage amount of the mobile terminal.

13 Claims, 9 Drawing Sheets

Background image     Call transmission     Background image after call transmission Call transmission is failed     Unread message     Anniversary day/RSSI  night/RSSI

APPARATUS AND METHOD FOR PROVIDING STANDBY SCREEN IMAGE OF MOBILE TERMINAL

BACKGROUND

The present invention relates to a method for displaying a standby screen image of a mobile terminal and, more particularly, to an apparatus and method for displaying a standby screen image of a mobile terminal capable of changing a standby screen image in a story-telling manner.

A mobile terminal is a device that can be carried around and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions, numerous attempts are being made and implemented in terms of hardware or software in such multimedia player or devices. For example, a user interface environment is provided to allow users to easily and conveniently search or select one or more functions.

Also, as users consider their mobile terminal to be a personal portable device that may express their personality, various designs for the mobile terminals are required.

Recently, in line with the development of the mobile communication technologies and the increase in the demands of users, various supplementary functions in addition to a basic call function are being provided by mobile terminals.

Among the supplementary functions, for example, an entertainment menu allows a user to select various images such as pictures or photos as wallpaper. That is, with this menu, the user can select his preferred picture or photo and set it as wallpaper in an image box menu, a sub-menu of the entertainment menu.

However, the related art background image used as a standby screen image is constantly displayed in a simple manner regardless of the number of calls, the number of messages received and transmitted, or other factors, which thus fail to arouse user interest.

SUMMARY

The present inventors recognized certain drawbacks of the related art, as explained above. Upon such recognition, the following concepts and features have been conceived.

One technical purpose of the present invention is to provide an apparatus and method for providing a standby screen image of a mobile terminal capable of providing an avatar-based standby screen image having a story-development function.

Another technical purpose of the present invention is to provide an apparatus and method for providing a standby screen image of a mobile terminal capable of providing emotional start information according to an event.

Still another technical purpose of the present invention is to provide an apparatus and method for providing a standby screen image of a mobile terminal capable of changing a standby screen image in a story-telling manner, in a growing manner, and the like according to the usage amount of the mobile terminal.

Thus, a method for providing a standby screen image of a mobile terminal, includes: displaying a standby screen image of a certain theme; and changing the displayed standby screen image in a story-telling manner according to a usage amount of the mobile terminal.

Also, a method for providing a standby screen image of a mobile terminal, includes: displaying a standby screen image of a certain theme; and growing the displayed standby screen image according to a usage amount of the terminal.

In addition, an apparatus for providing a standby screen image of a mobile terminal, includes: a memory that stores an image of a certain theme; and a controller that changes the displayed standby screen image in a story-telling manner according to a usage amount of the mobile terminal.

One or more certain themes may be provided, and the certain themes may include an omnibus-type cartoons, fairy tales, famous paintings, creative works, and the like.

The usage amount of the terminal may refer to the number of calls and messages received and transmitted.

The standby screen image may include an additional character that may set avatars of a user and another party.

The standby screen image may have a varied proceeding duration depending on the number of calls and messages transmitted and received, a call time duration and a particular person.

The standby screen image may include various visual information additionally displayed according to the occurrence of an event.

DETAILED DESCRIPTION

The mobile terminal according to an exemplary embodiment of the present invention will now be described in detail with reference to the accompanying drawings.

Figure 1:
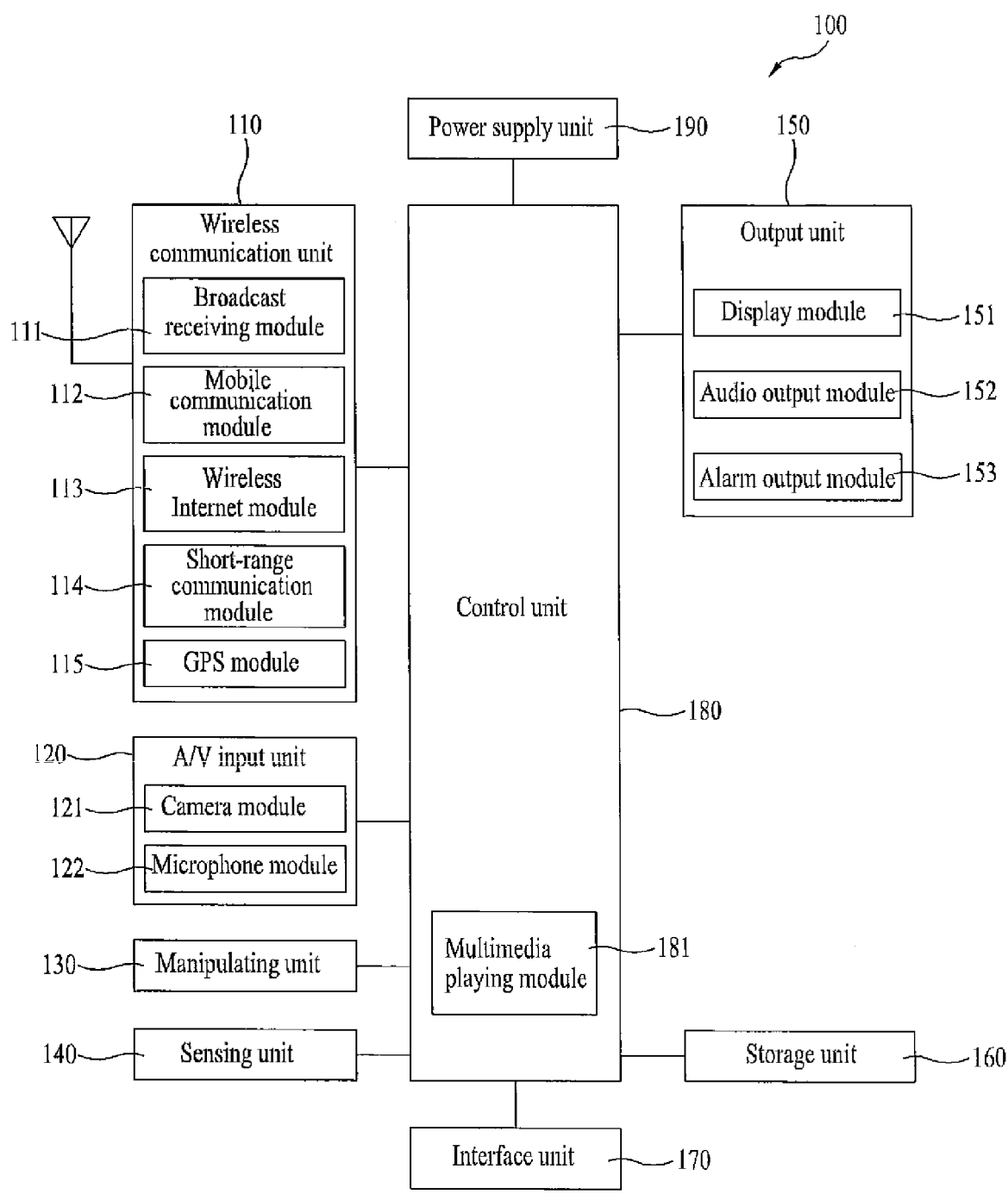
FIG. 1 is a schematic block diagram of a mobile terminal according to an exemplary embodiment of the present invention.

FIG. 1 is a schematic block diagram of a mobile terminal according to an exemplary embodiment of the present invention.

Mobile terminals may be implemented in various forms. For example, the terminals according to the exemplary embodiment of the present invention may include mobile phones, smart phones, notebook computers, DMB (Digital Multimedia Broadcasting) terminals, PDAs (Personal Digital Assistants), PMPs (Portable Multimedia Players), navigation, and the like.

The mobile terminal 100 as shown in FIG. 1 may comprise a wireless communication unit 110, an audio/video (A/V) input unit 120, a user input unit 130, a sensing unit 140, an output unit 150, a memory 160, an interface unit 170, a controller 180, and a power supply unit 190, and the like.

The mobile terminal as shown in FIG. 1 includes various elements. However, it is understood that implementing all the illustrated elements is not a requirement. Namely, the mobile terminal may be implemented with greater or fewer elements.

The elements will now be described.

The wireless communication unit 110 may include one or more components which permits wireless communication between the mobile terminal 100 and a wireless communication system or a network in which the mobile terminal is located. For example, the wireless communication unit may include a broadcast receiving module 111, a mobile communication module 112, a wireless internet module 113, a short-range communication module 114 and a location information module 115.

The broadcast receiving module 111 receives a broadcast signal and/or broadcast associated information from an external broadcast management server via a broadcast channel. The broadcast channel may include a satellite channel and a terrestrial channel. The broadcast management server may refer to a server that generates and transmits a broadcast signal and/or broadcast associated information or a server that receives a pre-generated broadcast signal and/or broadcast associated information and sends them to the mobile terminal. The broadcast associated information may include information associated with a broadcast channel, a broadcast program, or a broadcast service provider, etc. The broadcast signal may include not only a TV broadcast signal, a radio broadcast signal, and a data broadcast signal, but also a broadcast signal obtained by combining the data broadcast signal to the TV broadcast signal or the radio broadcast signal.

The broadcast associated information may be provided via a mobile communication network, and in this case, it may be received by the mobile communication module 112.

The broadcast associated information may exist in various formats. For instance, the broadcast associated information may exist in such formats as Electronic Program Guide (EPG) of Digital Multimedia Broadcasting (DMB), Electronic Service Guide (ESG) of Digital Video Broadcast-Handheld (DVB-H), and the like.

The broadcast receiving module 111 receives broadcast signals by using various types of broadcast systems. In particular, the broadcast receiving module 111 may receive digital broadcast signals by using digital broadcast systems such as Digital Multimedia Broadcasting-terrestrial (DMB-T), Digital Multimedia Broadcasting-satellite (DMB-S), Media Forward Link Only (MediaFLO™), Digital Video Broadcast-handheld (DVB-H), Integrated Services Digital Broadcast-Terrestrial (ISDB-T), and the like. The broadcast receiving module 111 may be configured to be suitable for certain broadcast systems that provide broadcast signals, as well as for the digital broadcasting systems.

Broadcast signals and/or broadcast associated information received via the broadcast receiving module 111 may be stored in the memory 160.

The mobile communication module 112 transmits/receives radio signals to/from at least one of a base station, an external mobile terminal and a server in a mobile communication network, and the like. Here, the radio signals may include a voice call signal, a video call signal, or various formats of data according to transmission/reception of text/multimedia messages.

The wireless Internet module 113 supports wireless network access. This module may be internally or externally coupled to the mobile terminal.

The short-range communication module 114 refers to a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal. For example, the location information module 115 may be embodied by using a GPS (Global Positioning System) module that receives location information from a plurality of artificial satellites. Here, the location information may include coordinate information represented by the latitude and longitude. For example, the GPS module may measure an accurate time and distance from three or more satellites and accurately calculate a current location of the mobile terminal according to trigonometry based on the three different distances. A method of acquiring distance and time information from three satellites and correcting an error with a single satellite may be used. In particular the GPS module may acquire an accurate time together with three-dimensional speed information as well as the location of the latitude, longitude and altitude from the location information received from the satellites.

The A/V input unit 120 is configured to input an audio or video signal. The A/V input unit 120 may include a camera 121 and a microphone 122. The camera 121 processes image data of still pictures or videos obtained by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and process it into audio data. The processed audio (voice) data may be converted for output into a format transmittable to a mobile communication base station via the mobile communication module 112 in case of the phone call mode. The microphone 122 may include various types of noise canceling (or suppression) algorithms to cancel (or suppress) noise generated in the course of receiving and transmitting audio signals.

The user input unit 130 may generate key input data inputted by a user to control various operations of the mobile terminal. The user input unit 130 may include a keypad, a dome switch, a touch pad (e.g., a touch sensitive member that detects changes in resistance, pressure, capacitance, etc.), a jog wheel, a jog switch, and the like. In particular, when the touch pad is overlaid on the display unit 151 in a layered manner, it may be called a touch screen.

The sensing unit 140 detects a current status (or state) of the mobile terminal 100 such as an open/close state of the mobile terminal 100, a location of the mobile terminal 100, a presence or absence of user contact with the mobile terminal 100, orientation of the mobile terminal 100, acceleration/deceleration of the mobile terminal 100, etc., and generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface with at least one external device connected with the mobile terminal 100. For example, the external devices may include wired/wireless headset ports, external power charger ports, wired/wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may be fabricated in the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data from the mobile terminal to an external device.

The output unit 150 is configured to provide outputs in a visual, audible, to and/or tactile manner (e.g., audio signal, video signal, alarm signal, etc.). The output unit 150 may include the display unit 151, an audio output module 152, an alarm unit 153, and the like.

The display unit 151 may output information processed in the mobile terminal 100. For example, when the mobile terminal 100 is in the phone call mode, the display unit 151 may display a User Interface (UI) or a Graphic User Interface (GUI) associated with a call or other communication. When the mobile terminal 100 is in the video call mode or the image capturing mode, the display unit 151 may display a captured and/or received image, a UI, a GUI, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED), a flexible display, a three-dimensional (3D) display, or the like. The mobile terminal 100 may include two or more display units (or other display means) according to its embodiment. For example, the mobile terminal may include an external display unit (not shown) and an internal display unit (not shown).

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile terminal 100. The audio output module 152 may include a speaker, a buzzer, or the like.

The alarm unit 153 may provide outputs to inform about an occurrence of an event of the mobile terminal 100. Typical events may include a call signal reception, a message reception, a key signal input, etc. In addition to audio or video outputs, the alarm unit 153 may provide outputs in a different manner to inform about an occurrence of an event. For example, the alarm unit 153 may provide outputs in the form of vibrations (or other tactile means). When a call signal, a message, or some other incoming communication is received, the alarm unit 153 may provide tactile outputs (i.e., vibrations) to inform the user. By providing tactile outputs, the user can recognize the occurrence of various events. Outputs informing about the occurrence of an event may be also provided via the display unit 151 or the audio output module 152.

The memory 160 may store software programs or the like used for the processing and controlling performed by the controller 180, or may temporarily store inputted/outputted data (e.g., a phonebook, messages, still images, video, etc.).

The memory 160 may include at least one type of storage medium including a flash memory type, a hard disk type, a multimedia card type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM) magnetic memory, a magnetic disk, an optical disk, and the like. Also, the mobile terminal 100 may cooperate with a network storage device that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separated from the controller 180.

The power supply unit 190 receives external or internal power and supplies power required for the operations of the respective elements under the control of the controller 180.

Various embodiments described herein may be implemented in a computer-readable medium using, for example, computer software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments are implemented by the controller 180.

For a software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

So far, the mobile terminal has been described from the perspective of the functions. Hereinafter, external elements of the mobile terminal will be described from the perspective of their functions with reference to FIGS. 2 and 3.

The mobile terminal may be implemented in a variety of different configurations, including a folder-type, a bar-type, a swing-type, a slide-type, or the like. For the sake of brevity, the slide-type mobile terminal will be used as an example in the following description. However, the concepts and features described herein should not be limited to the slide-type mobile terminal, but can be applicable to any type of mobile terminal or other electronic device including the ones as mentioned above.

Figure 2:
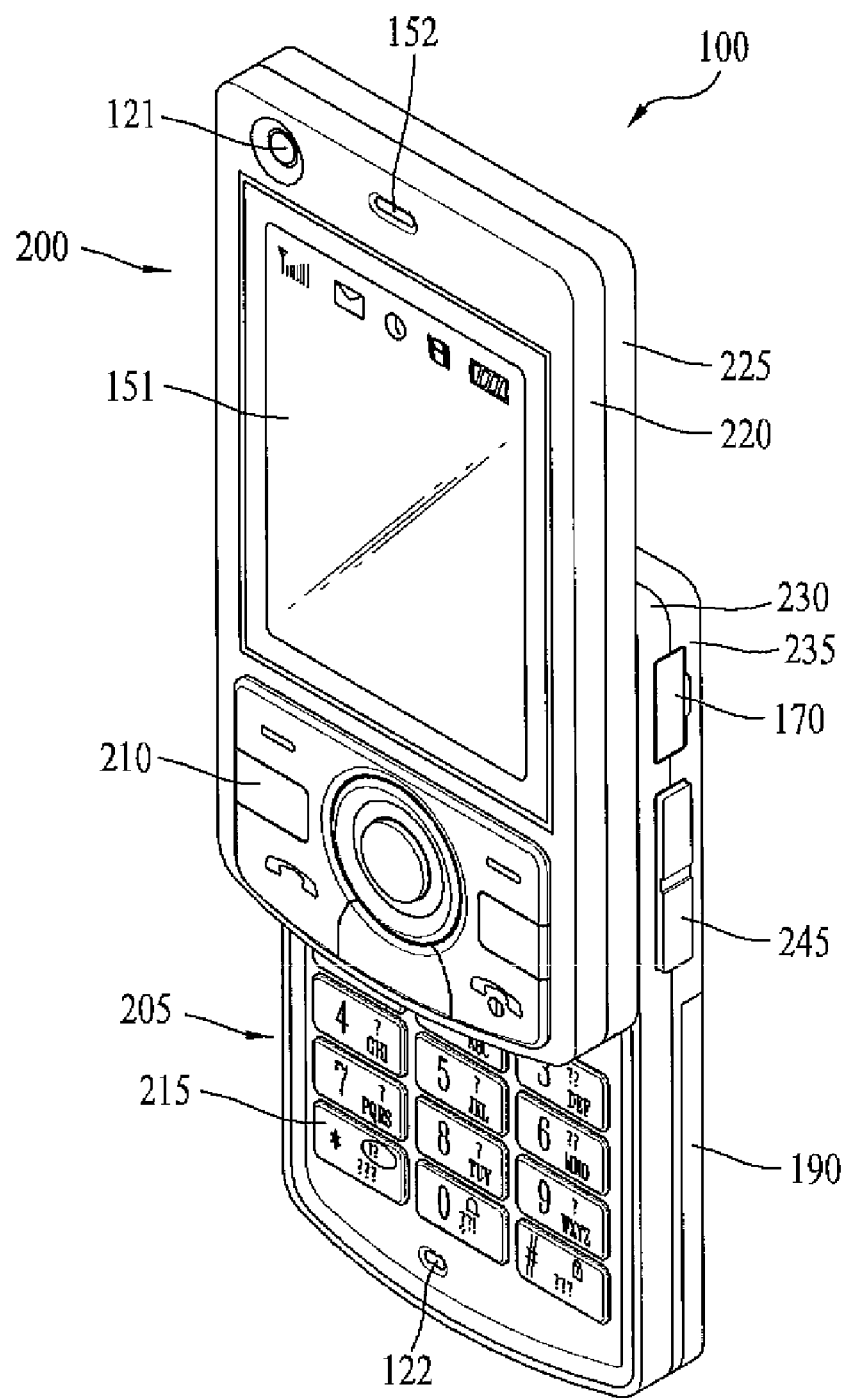
FIG. 2 is a front perspective view of the mobile terminal according to an exemplary embodiment of the present invention.

FIG. 2 is a front view of the mobile terminal according to an exemplary embodiment.

The mobile terminal may comprise a first body 200, and a second body configured to be opened from one side of the first body. If the mobile terminal is implemented as a folder type mobile terminal, the mobile terminal may include a first body and a second body of which one side is folded and unfolded with respect to the first body.

A state in which the first body 200 is disposed to overlap with the second body 205 may be called a closed configuration, and as shown in FIG. 2A, a state in which the first body 200 exposes at least a portion of the second body 205 may be called an open configuration.

The mobile terminal may usually operate in a standby mode in the closed configuration, but this mode can be released by user manipulation. Also, the mobile terminal may mainly function in a call mode in the open configuration, but may be changed to the standby mode according to user manipulation or after the lapse of a certain time.

At least one case (housing, casing, cover, etc.) constituting the external appearance of the first body 200 comprises a first front case 220 and a first rear case 225. Various electronic components may be installed inside the first front case 220 and the first rear case 225. One or more intermediate cases may be additionally disposed between the first front case 220 and the first rear case 225.

The cases can be formed by injection-molding a synthetic resin, or made of a metallic material such as stainless steel (STS) or titanium (Ti), or some other appropriate materials.

The display unit, the audio output module 152, a camera 121 or a first user input unit 210 may be located on the first front case 220 of the first body 200.

The display unit 151 may include an LCD (Liquid Crystal Display), an OLED (Organic Light Emitting Diode), and the like, that visually displays information.

A touch pad may be overlaid in a layered manner on the display unit 151 to allow the display unit 151 to function as a touch screen to input information by the user's touches.

The audio output unit 152 may be implemented in the form of a speaker.

The camera 121 may be implemented to be suitable for capturing images or video with respect to the user and so on.

Like the first body 200, the case constituting the external appearance of the second body 205 is formed by a second front case 230 and a second rear case 235.

A second user input unit 215 may be disposed on a front surface of the second body 205, specifically, on the second front case 230. A third user input unit 245, the microphone 122, the interface unit 170 may be disposed on at least one of the second front case 230 and the second rear case 235.

The first to third user input units 210, 215 and 245 may be generally called the manipulating unit 130, and various methods can be employed for the manipulation unit so long as they can be operated by the user in a tactile manner.

For example, the user input units 130 can be implemented as a dome switch or touch pad that can receive user commands or information according to user's pressing, pushing or touching, or implemented in the form of a wheel that rotates a key, a jog element, a joystick, or the like.

In terms of their functions, the first user input unit 210 is used for inputting commands such as start, end, scroll or the like, and the second user input unit 215 is used for inputting numbers, characters, symbols, or the like.

Also, the third user input unit 245 may operate as a hot key for activating a particular function within the mobile terminal.

The microphone 122 may be implemented as a suitable form to receive voice of the user, other sounds, etc.

The interface unit 170 may be used as a link (passage or path) through which the terminal can exchange data or the like with an external device. For example, the interface unit 170 may be implemented as one of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the mobile terminal, or the like.

The interface unit 170 may be a card socket for accommodating an external card such as a memory card for storing information.

The power supply unit 190 for supplying power to the terminal is located at the side portion of the second rear case 235.

The power supply unit 190 may be, for example, a rechargeable battery that can be detached.

Figure 3:
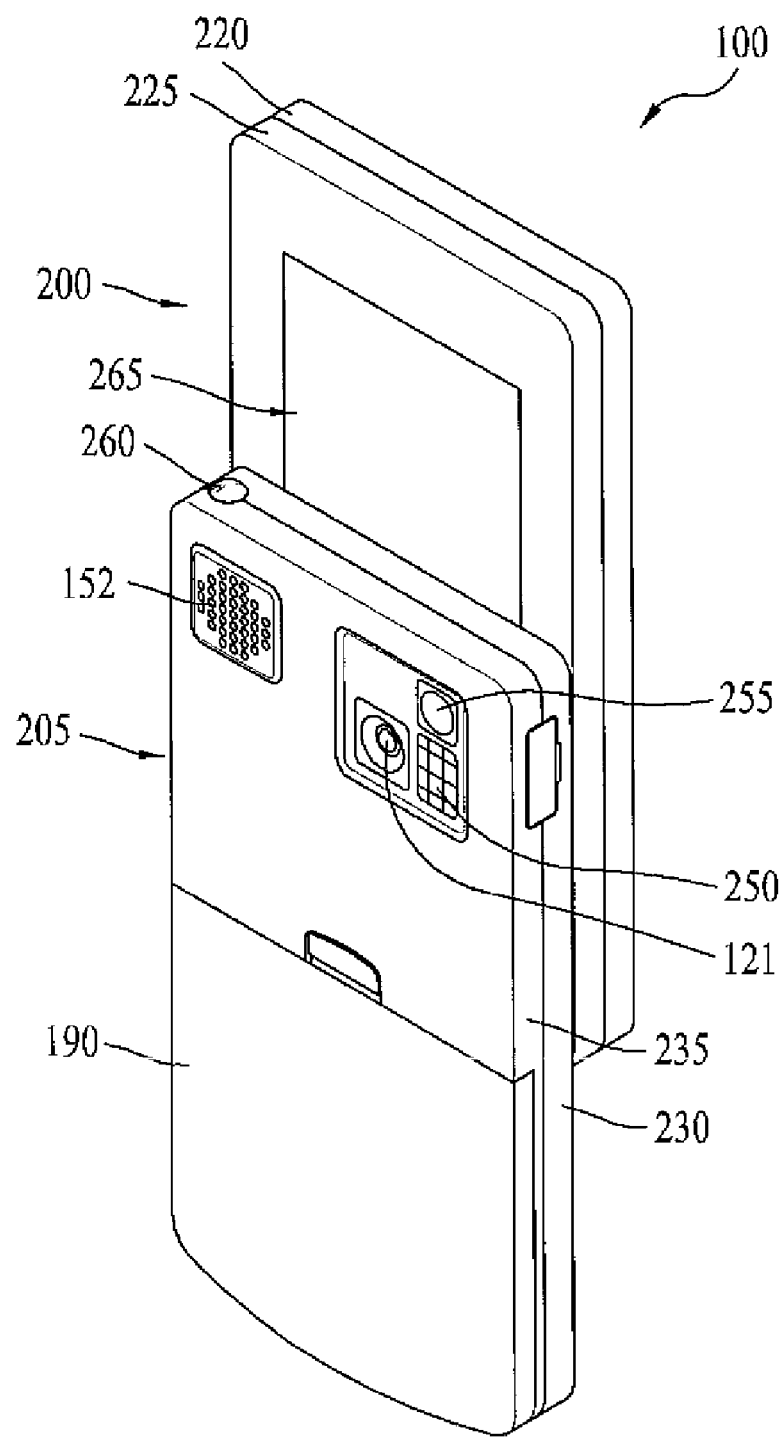
FIG. 3 is a rear perspective view of the mobile terminal according to an exemplary embodiment of the present invention.

FIG. 3 is a rear perspective view of the mobile terminal of FIG. 2 according to an exemplary embodiment.

With reference to FIG. 3, a camera 121 may additionally be disposed on a rear surface of the second rear case 235 of the second body 205. The camera 121 of the second body 205 may have an image capture direction which is substantially the opposite to that of the camera 121 of the first body 200, and may support a different number of pixels as that of the camera 121 of the first body.

For example, the camera 121 of the first body 200 may be used for low resolution (i.e., supporting a relatively small number of pixels) to quickly capture an image (or video) of the user's face and immediately transmit the same to the other party during video conferencing or the like. Meanwhile, the camera 121 of the second body 205 may be used for high resolution (i.e., supporting a relatively large number of pixels) in order to capture more detailed (higher quality) images (or video) which typically do not need to be transmitted immediately.

A flash 250 and a mirror 255 may be additionally disposed adjacent to the camera 121. When an image of the subject is captured with the camera 121 of the second body 205, the flash 250 illuminates the subject. The mirror 255 allows the user to see himself when he wants to capture his own image (self-image capturing) by using the camera 121 of the second body 205.

The second rear case 235 may further include an audio output module 152. The audio output module 152 may implement a stereophonic sound function in conjunction with the audio output module 152 of the first body 200 and may be also used for sending and receiving calls in a speaker phone mode.

A broadcast signal receiving antenna 260 may be disposed at one side or region of the second rear case 235, in addition to an antenna that supports mobile communications. The antenna 260 can be configured to be retractable from the second body 205.

One part of a slide module 265 that slidably combines the first body 200 and the second body 205 may be disposed on the first rear case 225 of the first body 200.

The other part of the slide module 265 may be disposed on the second front case 230 of the second body 205, which may not be exposed as shown in FIG. 3.

In the above description, the second camera 121 and so on is disposed on the second body 205, but such configuration is not meant to be limited.

For example, one or more of the elements (e.g., 260, 121 and 250 and 152 etc.), which are disposed on the second rear case 235 in the above description, may be mounted on the first body 200, mainly, on the first rear case 225. In this case, those elements disposed on the first rear case 225 can be protected (or covered) by the second body 205 in the closed configuration. In addition, even if the camera 121 of the second body is not provided, the camera module 121 may be configured to rotate (or otherwise be moved) to thus allow image capturing in various directions.

The mobile terminal 100 as shown in FIGS. 1 to 3 may be configured to operate within a communication system which transmits data via frames or packets, including wired/wireless communication systems and satellite-based communication systems.

Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (EDMA), time division multiple access (TDMA), code division multiple access (CDMA), and universal mobile telecommunications system (UMTS) (in particular, long term evolution (LTE)), and the global system for mobile communications (GSM), and the like. By way of non-limiting example only, further description will relate to a CDMA communication system, but such teachings apply equally to other system types.

Figure 4:
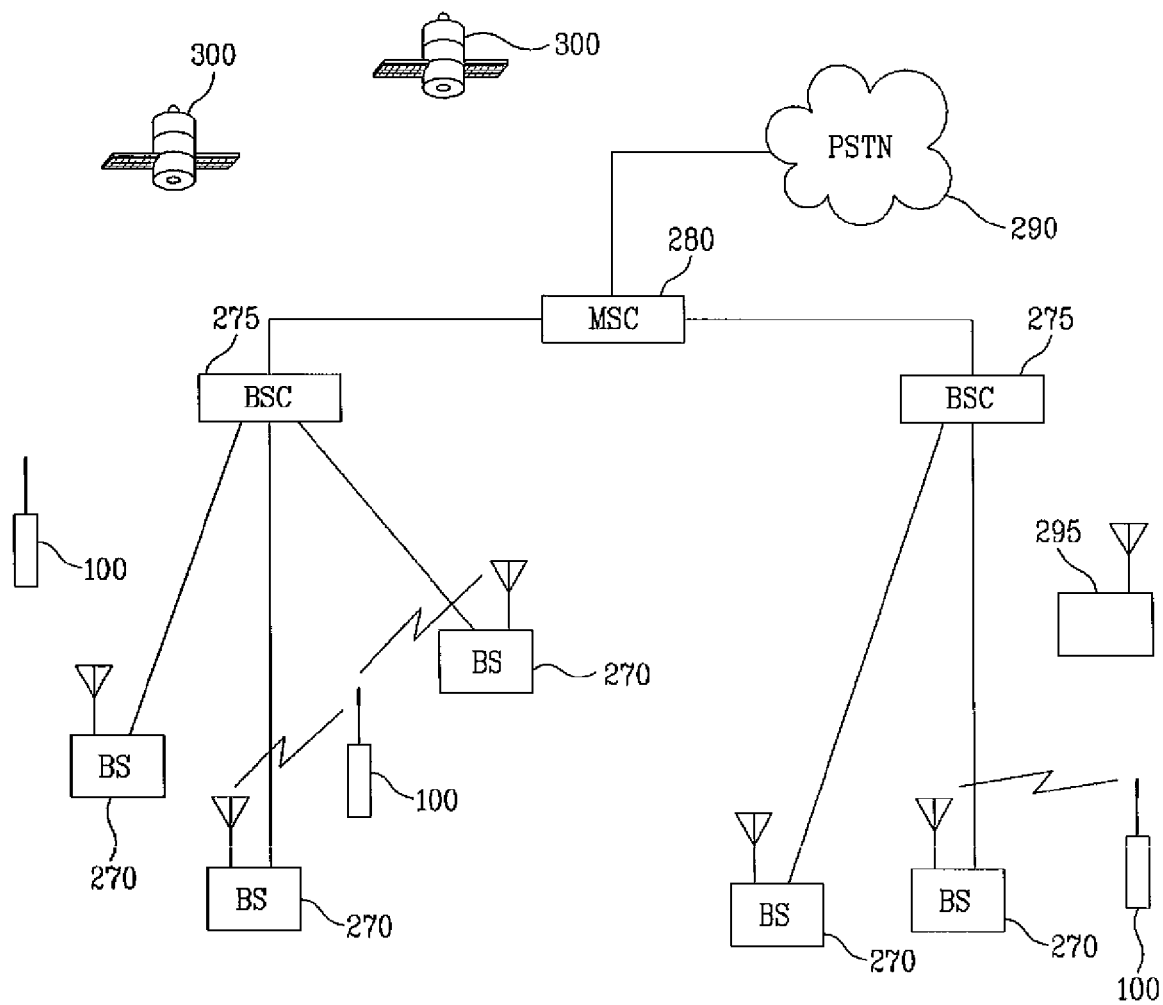
FIG. 4 is an exemplary view of a wireless communication system operable with the mobile terminal according to an embodiment of the present invention.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275. The BSCs 275 may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may include one or more sectors, each sector having an omni-directional antenna or an antenna pointed in a particular direction radially away from the BS 270. Alternatively, each sector may include two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs). In such case, the term "base station" may be used to refer collectively to a single BSC 275 and at least one BS 270. The BSs may also denote "cell sites". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided within the terminal 100 to receive broadcast signals transmitted by the BT 295.

FIG. 3 shows several global positioning system (GPS) satellites 300. Such satellites 300 facilitate locating the position of at least one of the mobile terminals 100.

In FIG. 4, two satellites are depicted, but it is understood that useful positioning information may be obtained with two or less or more satellites. The GPS module 115 as shown in FIG. 1 is typically configured to cooperate with the satellites 300 to obtain desired position information.

Here, besides the GPS tracking technologies, any technologies that may track the location of the mobile terminals may be used to track the location of the mobile terminals. In addition, at least one of the GPS satellites 300 may selectively or additionally handle satellite DMB transmission.

As one of typical operations of the wireless communication system, the BSs 270 receive reverse-link signals from various mobile terminals 100. The mobile terminals 100 are engaging in calls, messaging, and other communications. Each reverse-link signal received by a particular base station 270 is processed within the particular BS 270.

The resulting data is forwarded to an associated BSC 275. The BSC provides call resource allocation and mobility management functionality including the orchestration of soft handoffs between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

The present invention provides a method for changing a standby screen image in a story-telling manner according to the occurrence of a communication event. Namely, the present invention provides a functional wallpaper (or a background screen image) having a storytelling function, and in this case, the functional wallpaper is changed according to a usage form of a user terminal. For this, in the present invention, a wallpaper having a certain story (theme or scene) is displayed on a display module.

Preferably, the communication event may include every event that may be generated during operation of the mobile terminal, such as call transmission and reception, a message transmission and reception, alarm, a battery status, etc.

Preferably, the theme displayed on the standby screen may include an omnibus-type cartoons (four cuts or six cuts), fairy tales famous paintings, creative works, and the like.

A supplementary character for setting avatars of the user and another party can be set together with the theme on the standby screen image. Accordingly, when an event related to the standby screen occurs, for example, when a call or a text message is received, the display module displays the avatars of the user and another party.

The standby screen image may include a fixed type standby screen image that proceeds according to a usage amount of the terminal by connecting various themes or scenes and a growing type standby screen image that grows according to the usage amount of the terminal. The two standby screen images may be configured independently or in conjunction.

For example, when the two types of standby screen images are used in conjunction, the screen images are shifted according to the number of calls and messages transmitted, and when calls or messages are received by more than a certain number of times, an entity for decorating the standby screen image may be generated or the user's avatar may be grown. Once the decoration or growing of the standby screen image is completed, the screen image may be shifted again, and such operation may be repeatedly performed.

Figure 5:
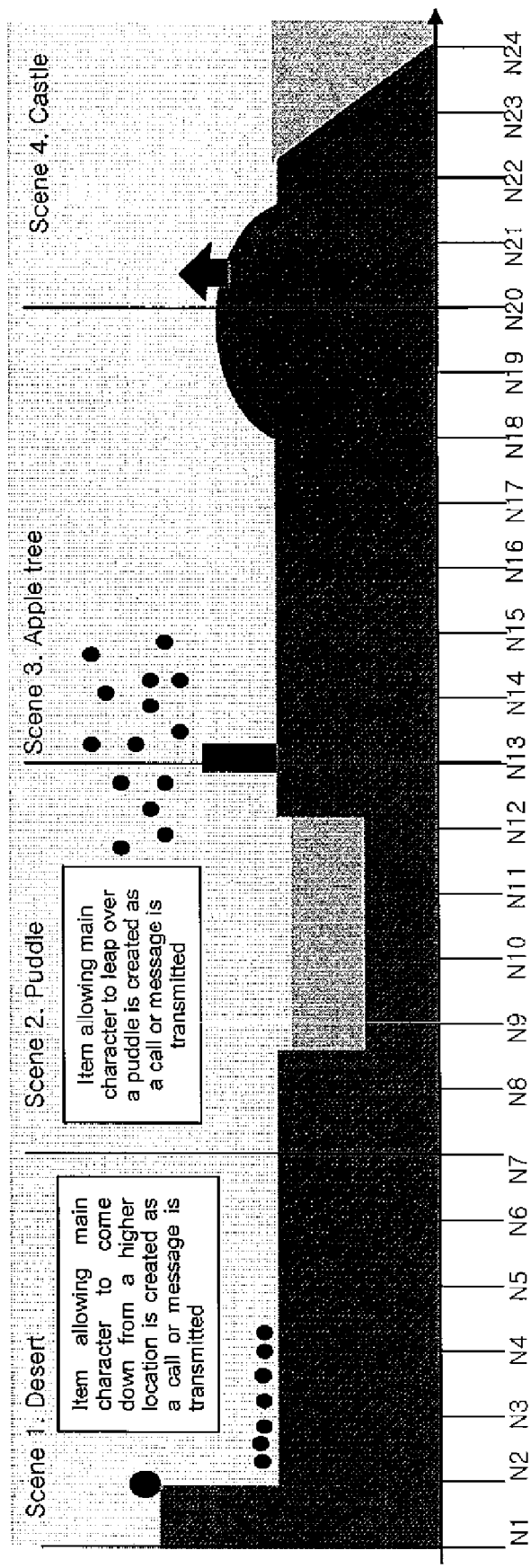
FIG. 5 shows a concept of standby screen images of various themes according to an exemplary embodiment of the present invention.

FIG. 5 shows a concept of standby screen images of various themes according to an exemplary embodiment of the present invention.

As shown in FIG. 5, standby screen images are configured as a story created by connecting various themes or scenes, and then the story is controlled to be changed (to proceed) according to the number of calls and messages transmitted.

Figure 6:
FIG. 6 shows initial states of standby screen images having a story by connecting various themes and scenes.
Figure 6:
Figure 6:
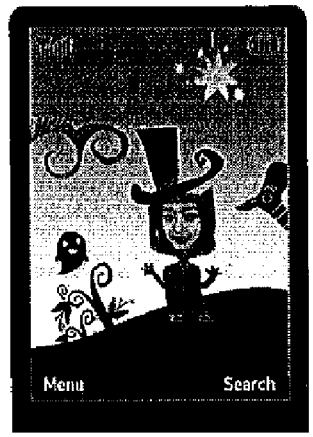

When the user turns on the mobile terminal, an initial standby screen images having a story created by connecting various themes and scenes as shown in FIG. 6 are displayed.

Thereafter, the development of the story is made depending on the usage amount of the terminal, and the usage amount of the terminal is calculated by combining the number of originated (transmitted) calls (or received calls) and messages. For example, as shown in FIG. 5, in the present invention, it can be configured such that each theme or scene may be divided into small sections (N) and each small section (N1) may not proceed (may not be changed) until a call is performed one time and a message transmission performed ten times.

Thereafter, when the terminal is further used so the usage amount of calls or messages is increased, the controller counts the corresponding number to control the proceeding of the standby screen image. In this case, the number of calls and messages that may be determined to proceed with the next theme may be selected by the user properly as desired.

As shown in FIG. 5, the development of the story may be made stepwise in each theme or each scene as well as by themes or scenes. For example, an icon (e.g., a circular item or other graphical object) in the theme 1 (or the scene 1) may not come down from a hill until the user performs calls one time and transmits messages ten times, and the circular item may not leap over a puddle (or brook) until the user performs calls three times and transmits messages thirty times or more. Of course, these conditions may be varied.

In addition, the development of the story may be differentially performed according to a particular case such as the number of calls, a call duration, a particular person, and so on. Namely, when the user performs call communication for a long time, performs call communication with a family member, or sends a message to a family member, the development of the story may have a different duration of shifting from the duration when the user performs call communication for a short time, performs call communication with someone or sends a message to someone, or the image of the standby screen image may be changed. Or, the development of the story may not be made well such as a Blue Marble at a particular area.

Also, in the present invention, the standby screen image can be changed during reception of a call or a message. For example, an image or an avatar of a recipient may remain for a certain time duration on the standby screen after call communication, an entity for decorating the standby screen may be generated when messages are received by more than a certain number of times, or the avatar of the user may be grown (or ornamented).

In the present invention, a message for giving a hint to the user may be displayed immediately before the standby screen image is changed to a next theme or a next scene. The message may include a message that inquires after a person (parents, friends, relatives, etc) such as 'Call Mom'.

In addition, in the present invention, the standby screen images may not be sequentially shifted but changed in their proceeding order according to an event. For example, it is assumed that the story includes 'Little Prince'-'Journey of The Wizard of Oz'-'Pinocchio'-'Bremen Band', etc. and the 'Journey of The Wizard of Oz' is being displayed on the standby screen.

If the user makes a call or sends a message, The image of standby screen is shifted to the next story 'Pinocchio', and when a new friend is registered in a phone book, the image of the standby screen may shifted to 'Bremen Band'. If a remaining battery capacity is small, the standby screen image may be shifted to the previous story, 'Little Prince'.

This method is aimed to make the stories rich and fun by giving variables to the development of the stories when a particular event occurs in each story.

When a particular event occurs while the standby screen image is proceeding, differential visual information is provided while changing the standby screen image.

Figure 7:
FIGS. 7 and 8 show examples of visual information provided when a particular event occurs according to an exemplary embodiment of the present invention.
Figure 7:
Figure 7:
Figure 8:
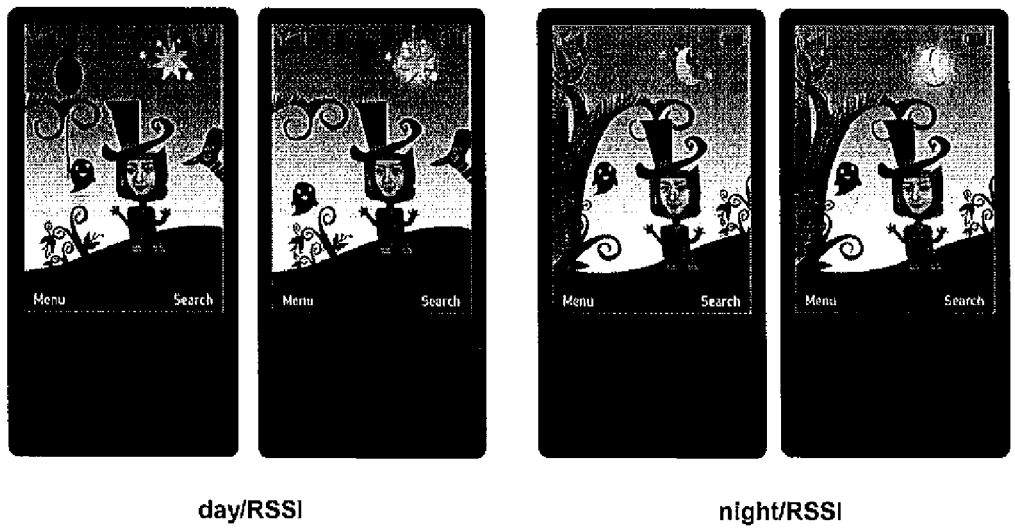

For example, when a message is received, a supplementary character (in case of 'The Snow White', a dwarf witch, prince) may be displayed as an image of a sender, and after the message is received, supplementary items such as the cloud or a flower may be displayed. In addition, as shown in FIGS. 7 and 8, if there is a missed call or an unread message, the information of another party is displayed and an item of a negative (pessimistic) image such as, for example, rain or a flying bat is displayed on the standby screen. The standby screen image may be changed according to national holidays, an RSSI, or the battery strength, and the time of day or night may be displayed.

The present invention provides a growing type standby screen image that is changed according to a usage amount of the mobile terminal. That is, a simple background image can be provided as a default screen image, and an item may be added or the shape of an animation character and sound may grown according to the usage amount of the terminal, namely, the number of calls and messages transmitted. In this case, the shape of the animation character may include the costume, or a hair style. The sound may include a weak sound of water, rain or birds, etc., according to a background.

As described above, the fixed type standby screen image and the growing type standby screen image may be used together. For example, a background item (e.g., tree) may be grown depending on the number of events on a single standby screen image, and when the background item is completely grown, the next screen image may be displayed. In this case, the number of items included in each theme or scene may be selected properly, and the standby screen image including the generated item may be transmitted to a different terminal.

In the configuration and development method of the standby screen as described above, each story is developed in association with the occurrence of a communication event to change the standby screen image to provide emotional and fun graphics to the user.

Figure 9:
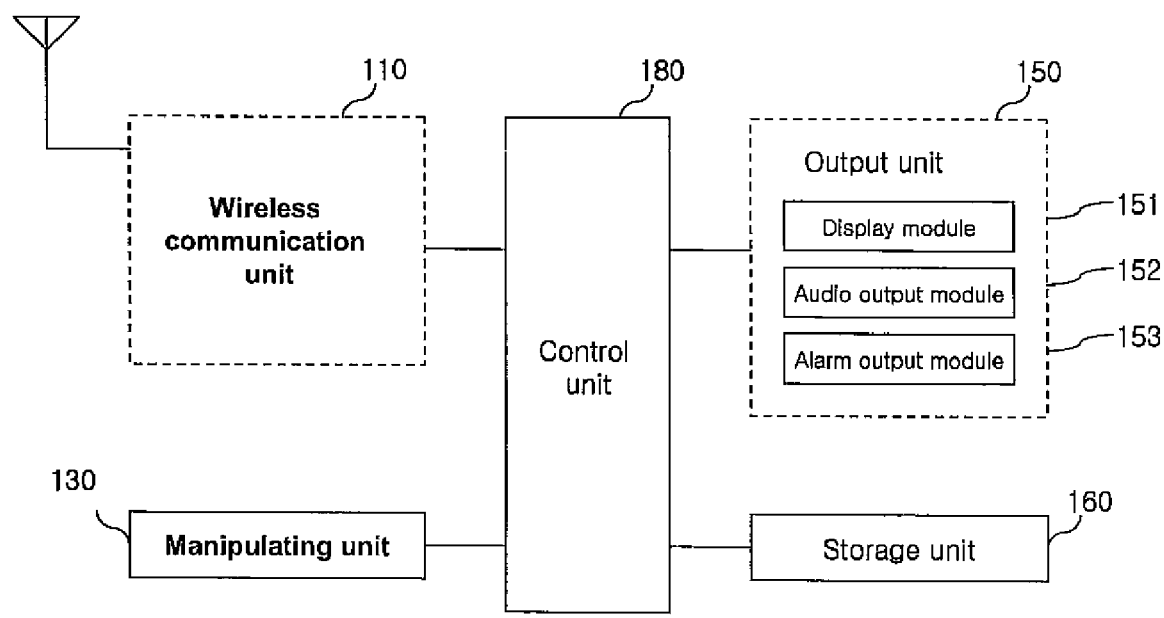
FIG. 9 is a schematic block diagram of an apparatus for displaying a standby screen image of a mobile terminal according to an exemplary embodiment of the present invention.

FIG. 9 is a schematic block diagram of an apparatus for displaying a standby screen image of a mobile terminal according to an exemplary embodiment of the present invention.

As shown in FIG. 9, the apparatus for displaying a standby screen image of a mobile terminal according to an exemplary embodiment of the present invention includes: the manipulating unit 130 having various function keys; the memory 160 that stores stories to be displayed, various time information, and avatars; the display module 151 that displays the stories, the time information and avatars stored in the memory 160 and changes a corresponding story according to a usage amount of the terminal and various events; and a wireless communication unit 110 that performs voice and data communication.

The manipulating unit 130 serves to enter various menus, clear a hurdle on a standby screen image, or change the location of a hero among avatars displayed on the standby screen.

The display module 151 may be formed as an LCD or a touch panel (or a touch screen), and the controller 180 may perform a general operation to develop (proceed and change) the stories. Preferably, the stories include a fixed type story that proceeds with according to the usage amount of the terminal by connecting various themes and scenes and a growing type story that grows according to the usage amount of the terminal. Each theme or scene has an omnibus form by using cartoons, fairy tales, famous paintings, various creative works, and the like.

The controller 180 may be formed as an MSM (Mobile Station Modem) and a processor, and the wireless communication unit 110 may serve to transmit and receive a call, a message, a standby screen image including a generated item to a different terminal.

The operation of the mobile terminal to provide a standby screen image with the story-development function according to an exemplary embodiment of the present invention will now be described.

Figure 10:
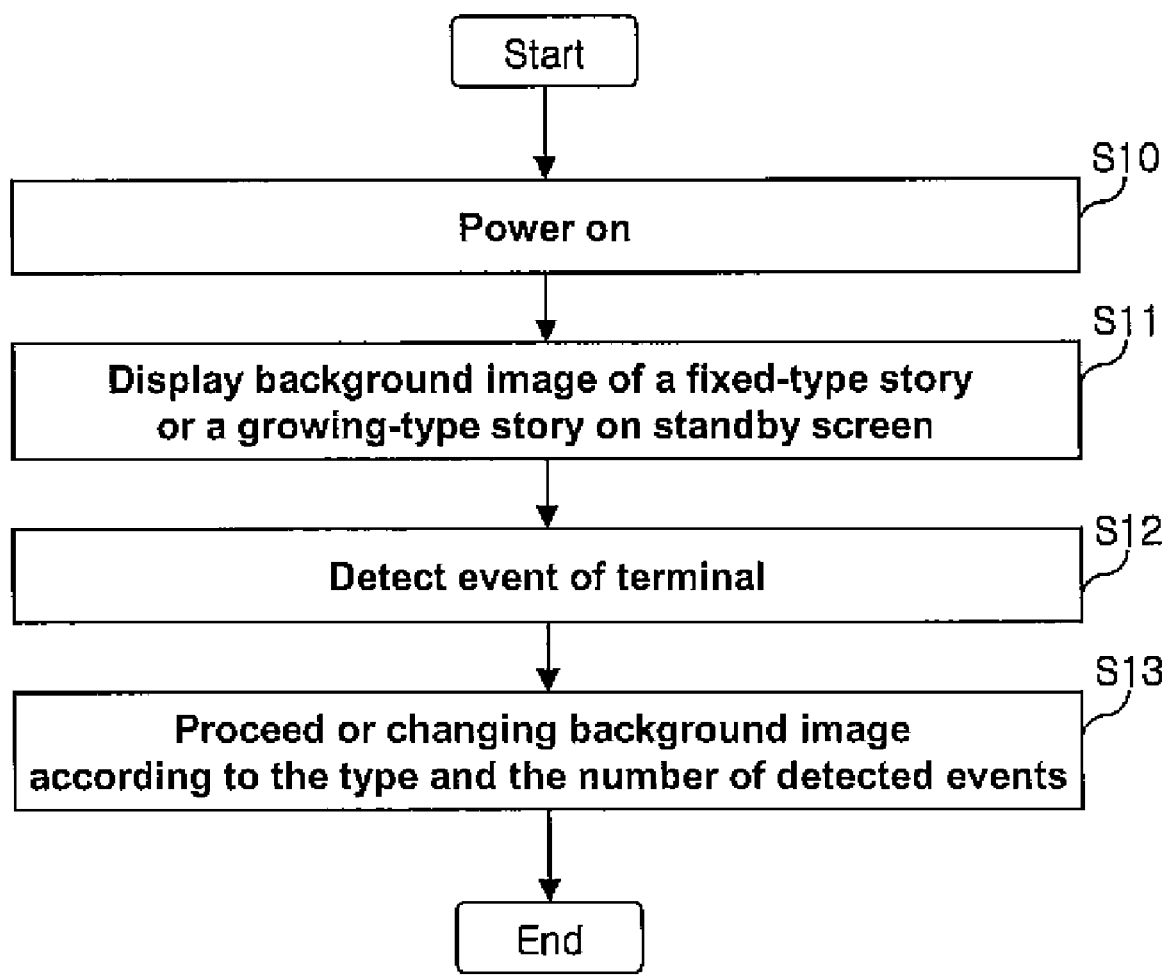
FIG. 10 is a flow chart illustrating the process of a method for displaying a standby screen image of a mobile terminal according to an exemplary embodiment of the present invention.

FIG. 10 is a flow chart illustrating the process of a method for displaying a standby screen image of a mobile terminal according to an exemplary embodiment of the present invention.

When the user turns on power of the terminal (S10), the controller reads a standby screen image of a story formed by connecting various themes or scenes from the memory 160 and displays the same on the standby screen (S11). In this case, the story may be a fixed type story, a growing type story, or a form obtained by combining the two types of stories. The standby screen image displayed on the standby screen may proceed according to transmission of a call or a message, and its control operation is performed by the controller 180.

Figure 11:
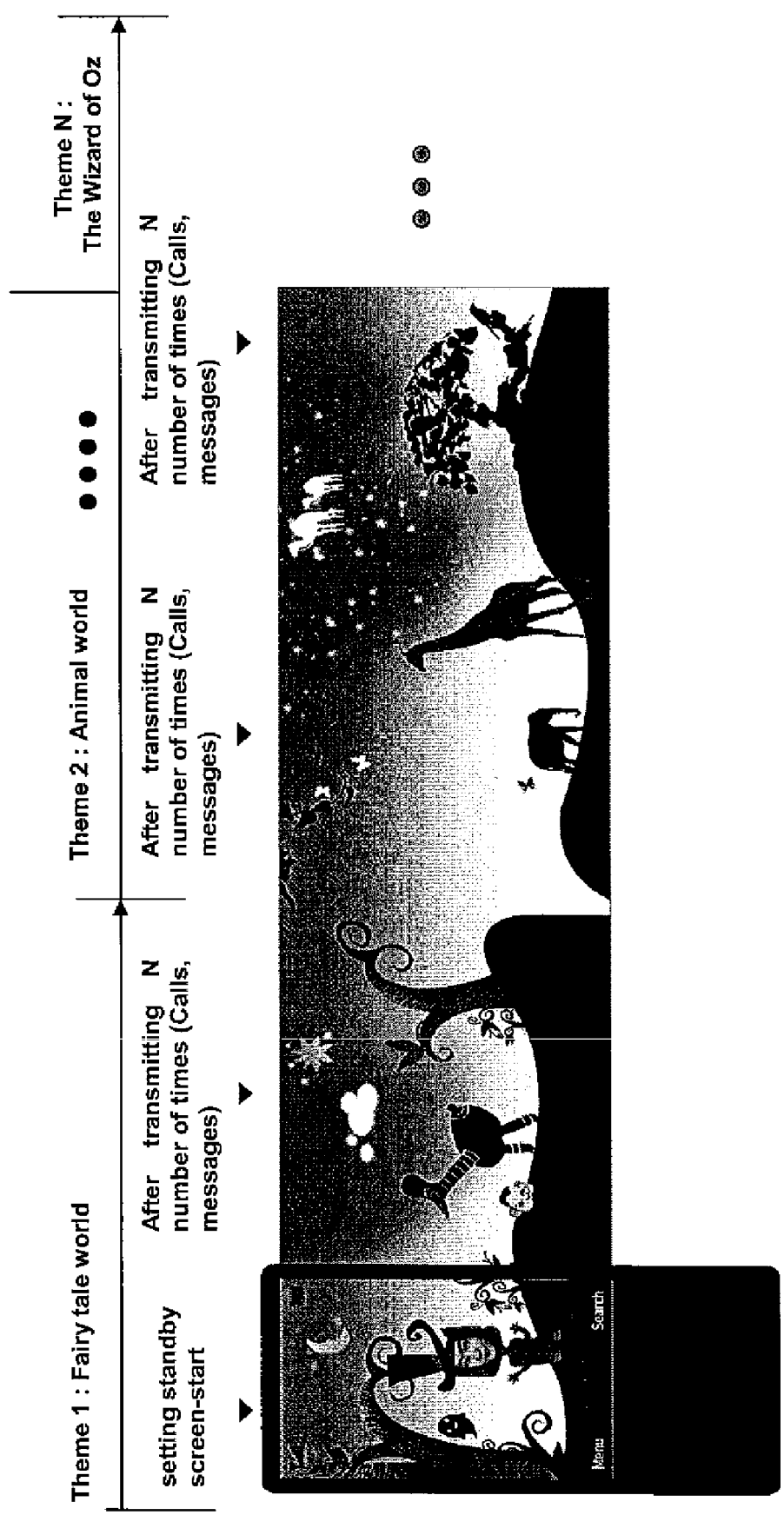
FIG. 11 shows an example of screen images of various themes.

For example, as shown in FIG. 11, the controller 180 may read a standby screen image of a story formed by connecting various themes or scenes, namely an image of a theme 1 (Fairy tale world) in which the user is a hero (or main character) who starts to make a journey in search of the Wizard of Oz from the memory 160 and displays the same on the display module 151.

The avatar of the user that sets the user himself as the hero of the story and that of another party are displayed on the standby screen image.

In this state, the controller 180 detects various events of the mobile terminal (S12) and proceeds with and change the standby screen image by using the above-described method (S13). In this case, the proceeding order of themes may vary depending on the events (e.g., a call, a message and a missed call), etc.

For example, when the user originates (transmits) calls or messages, the controller 180 counts the corresponding number and controls the proceeding into the next theme (theme 2: Animal world), and as described above, the information of another party and visual information are displayed in each theme to change the standby screen image. Namely, when the usage amount of the terminal reaches 'N' times (call, message) in the theme 2, 'Animal world', the controller 180 provides control to show graphics such that vine leaves fall from the sky to encircle the neck of a giraffe and displays the user avatar. Thereafter, when the usage amount of the terminal is increased, the controller 180 provides control to change the standby screen image such that the vine leaves swallow the giraffe.

Accordingly, when the present invention is applied, even if a plurality of users may have standby screen images of the same stories, the users would have each different standby screen image when a certain time lapses according to the usage amount of calls and messages. In this manner, the present invention provides the embodiments of the functional standby screens having the story-development function that can be applicable to various cases.

As so far described, the present invention provides the standby screen images of the fixed type story and/or the growing type story by connecting various themes, and in this case, the standby screen images can be changed according to the usage amount of the terminal and various events of the terminal to thus provide more emotional and interesting service to the user.

In the embodiments of the present invention, the above-described method can be implemented as software codes that can be read by a computer in a program-recorded medium. The non-transitory computer-readable medium includes various types of recording devices in which data that can be read by a computer system is stored. The non-transitory computer-readable medium may include a ROM, a RAM, a CD-ROM, a magnetic tape, a floppy disk, an optical data storage device, and the like. In addition, the computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method for providing a standby screen image of a mobile terminal, comprising:
    displaying, by the mobile terminal, a standby screen image of a certain theme;
    displaying, by the mobile terminal, call and battery related icons on the standby screen image, the call and battery related icons having a fixed size relative to the standby screen image; and
    changing, by the mobile terminal and according to a usage amount of the mobile terminal, the displayed standby screen image according to a story having a beginning, a middle and an end,
    wherein the usage amount of the terminal corresponds to a number of calls transmitted or a number of messages transmitted,
    wherein the step of changing the displayed standby screen image includes changing a size of an item in the displayed standby screen image according to the usage amount of the mobile terminal or causing the item in the displayed standby screen image to move according to the usage amount of the mobile terminal, and
    wherein the step of changing the displayed standby screen image includes varying a pace through the story depending on the usage amount, a duration of a current call and one of an identifier (ID) of a recipient of the current call and an identifier (ID) of a recipient of a current message.

2. The method of claim 1, wherein one or more certain themes are provided and comprise an omnibus type cartoons, fairy tales, famous paintings, and creative works.

3. The method of claim 1, wherein the story is divided into a plurality of sections and each section does not proceed until a certain number of calls are performed.

4. The method of claim 1, wherein the standby screen image provides a supplementary character that sets avatars of a user and another party.

5. The method of claim 1, wherein the pace through the story is changed according to a particular event, and various visual information is additionally displayed on the standby screen according to an occurrence of the particular event.

6. The method of claim 5, wherein the particular event includes a message, a call, a holiday, a received signal strength indication (RSSI), a battery strength, and day and night.

7. The method of claim 1, further comprising:
displaying a message including a user hint before changing the standby screen image to a next theme or scene.

8. An apparatus for providing a standby screen image of a mobile terminal, comprising:
a memory;
a display unit; and
a controller operatively connected to the memory and the display unit, the controller configured to
display a standby screen image of a certain theme,
display call and battery related icons on the standby screen image, the call and battery related icons having a fixed size relative to the standby screen image, and
change, according to a usage amount of the mobile terminal, the displayed standby screen image according to a story having a beginning, a middle and an end,
wherein the usage amount of the terminal corresponds to a number of calls transmitted or a number of messages transmitted,
wherein the controller is further configured to
change a size of an item in the displayed standby screen image according to the usage amount of the mobile terminal or causing the item in the displayed standby screen image to move according to the usage amount of the mobile terminal, and
vary a pace through the story depending on the usage amount, a duration of a current call and one of an identifier (ID) of a recipient of the current call and an identifier (ID) of a recipient of a current message.

9. The apparatus of claim 8, wherein one or more certain themes are provided and comprise an omnibus type cartoons, fairy tales, famous paintings, and creative works.

10. The apparatus of claim 8, wherein the story is divided into a plurality of sections and each section does not proceed until a certain amount of calls are performed.

11. The apparatus of claim 8, wherein the controller provides a supplementary character that sets avatars of a user and another party on the standby screen image.

12. The apparatus of claim 8, wherein the controller is configured to vary the pace through the story according to a particular event, and display various visual information on the standby screen according to an occurrence of the particular event.

13. The apparatus of claim 12, wherein the particular event includes a message, a call, a holiday, a received signal strength indication (RSSI), a battery strength, and day and night.

* * * * *